Nov. 24, 1931.  R. L. DRAKE  1,833,417
CONVEYER SYSTEM
Original Filed Aug. 13, 1924  5 Sheets-Sheet 1

FIG.I.

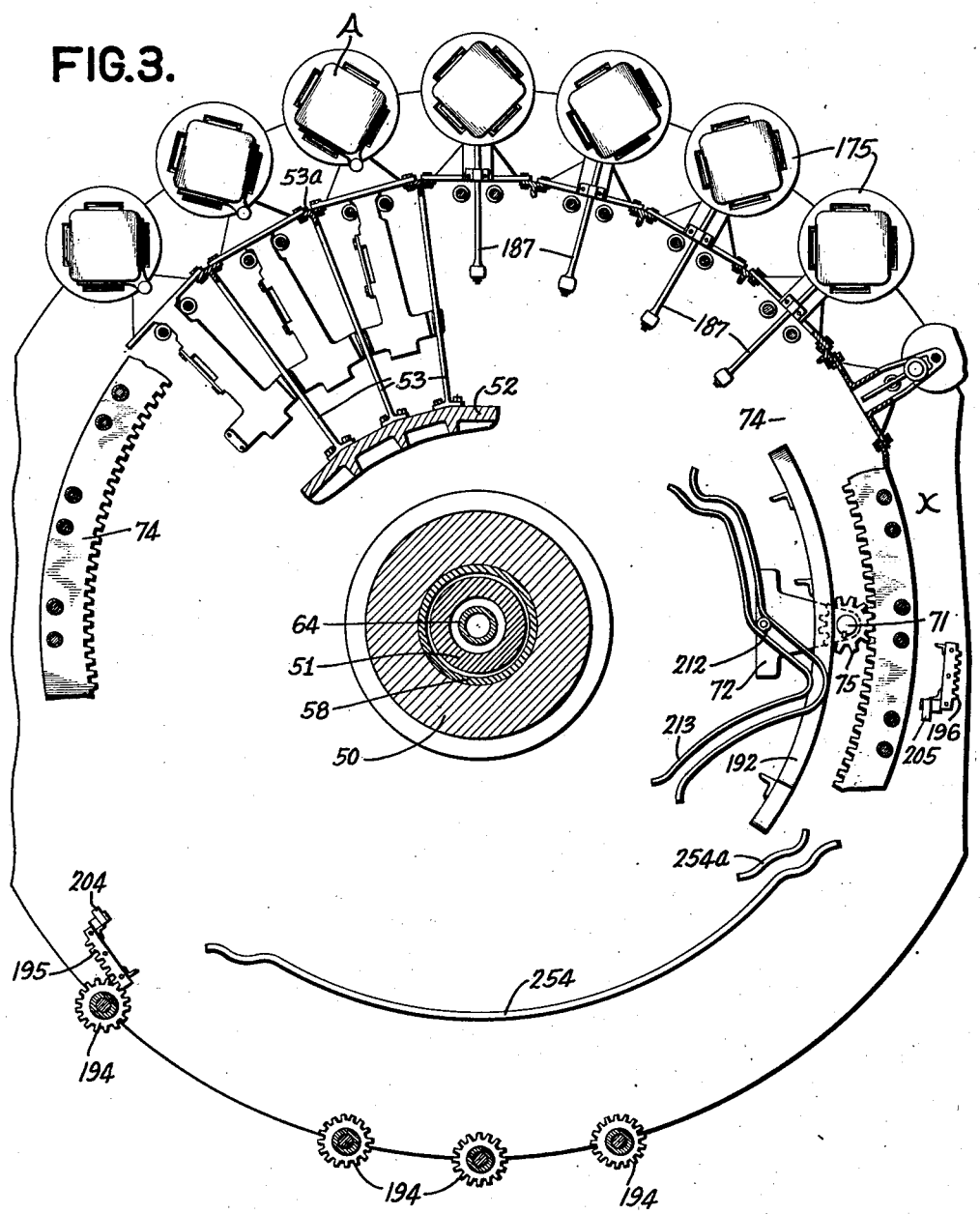

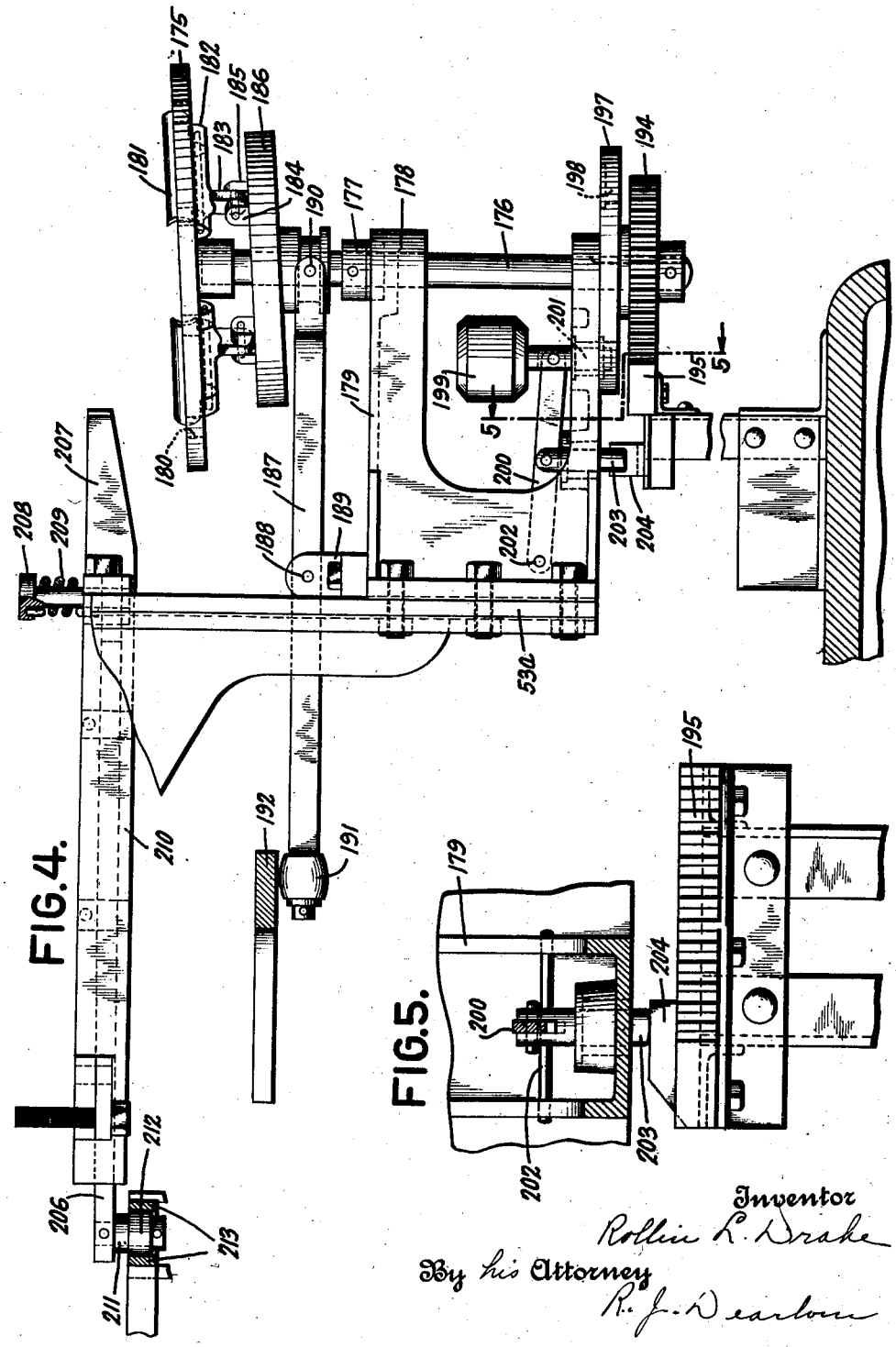

Nov. 24, 1931.                R. L. DRAKE                 1,833,417
                            CONVEYER SYSTEM
                    Original Filed Aug. 13, 1924    5 Sheets-Sheet 5
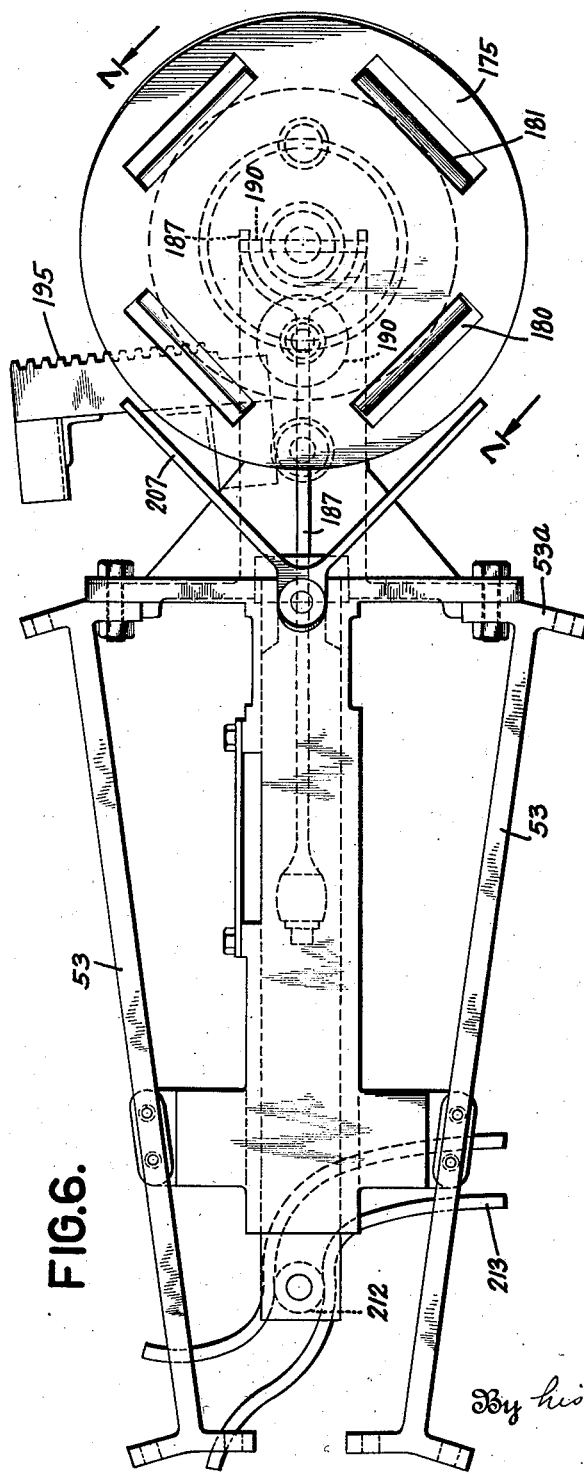
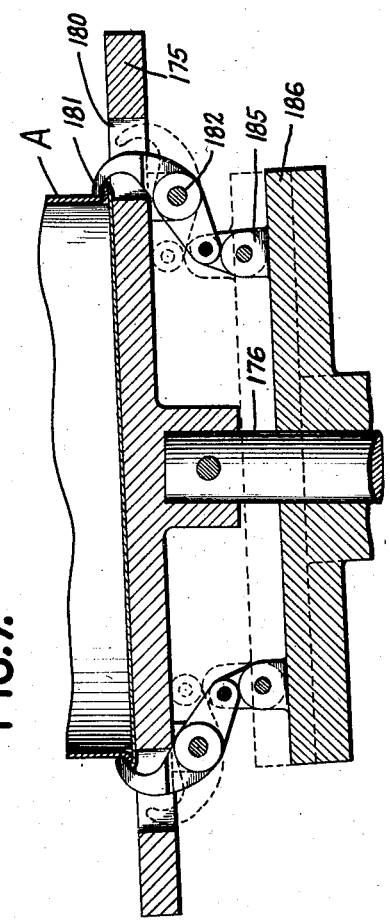

Patented Nov. 24, 1931

1,833,417

UNITED STATES PATENT OFFICE

ROLLIN L. DRAKE, OF PORT ARTHUR, TEXAS, ASSIGNOR TO THE TEXAS COMPANY, OF NEW YORK, N. Y., A CORPORATION OF DELAWARE

CONVEYER SYSTEM

Original application filed August 13, 1924, Serial No. 731,730. Divided and this application filed April 30, 1929. Serial No. 359,195.

The invention relates to apparatus for transferring articles from one point to another and is more particularly applicable to a system in which certain operations are performed on the articles in the course of their transit.

This is a division of my co-pending application Serial No. 731,730, filed August 13, 1924. In the parent case there is disclosed an improved form of apparatus for introducing measured quantities of a fluid medium, such as gasoline or kerosene, into suitable containers and for sealing and capping these containers. The latter are carried by the conveyer system forming the basis of the present invention.

One of the features of the invention is the provision of separate supporting elements for each container carried by the system. These supports are adjustable on the main conveyer element so that the containers may be carried from a position in which a filling operation takes place to that in which the capping of the container may be effected. As herein disclosed, the main conveyer element is in the form of a rotary member or platform which is mounted on a stationary pedestal. Insofar as many of the features of the present invention are concerned, this construction might be replaced by any suitable form of endless conveyer or other means for carrying the containers through a definite cycle. The individual supports, as disclosed, assume the form of rotatably mounted tables which are preferably so arranged as to provide a supporting surface at a slight inclination from the horizontal. Provision is made for automatically adjusting or rotating the individual supports on the main conveyer element as the latter passes certain definite points in its cycle of movement. Suitable detents are provided for retaining the rotatable supports in one or another of their positions of adjustment and this has necessitated the provision of means for automatically disabling or releasing these detents just prior to the turning of the supports to a new position.

Another feature of the invention has to do with the provision of means for ejecting the containers as they reach a desired point in the cycle of operation of the main conveyer element. The operation of the ejecting means is so timed as to insure the transfer of the containers from the individual supports to a travelling belt, or other conveyer, leading from the machine to any suitable point.

A special feature of the ejecting mechanisms is in the provision of a quick action so that the containers may be discharged from the apparatus during a relatively small portion of the cycle of operation of the main conveyer element. At the same time the construction is such that the danger of injuring the containers, which might arise from a sudden blow from the ejector arm, is eliminated. Furthermore, the operating means for the ejectors is so designed as to provide for a quick restoration of the parts so that they will not obstruct the individual supports for more than a brief period. This is to enable a new container to be quickly placed upon each support after an old container has been ejected. In this connection the ejector is withdrawn in two stages, the first stage being merely sufficient to enable the insertion of a new container on the support. The active end of the ejector, at this time, is so situated as to provide a positioning means against which the new container may be thrust in applying it to the support. Subsequently, the ejector will be more fully withdrawn so that it will not interfere with the rotary movement of the supporting table, which has been previously mentioned. In order to prevent any danger of injuring the containers by means of the ejector in the event that certain of the parts should become jammed, a flexible driving connection is provided between the operating source and the engaging element of the ejector.

A further feature of the invention is in the provision of suitable gripping devices for retaining the containers, or other articles, on the individual supports during the operating cycle. These gripping devices are cam-operated in such a way as not to interfere with the insertion of the containers at the proper point in the cycle and not to interfere with the discharge of the containers by means of the ejector mechanism at the appropriate point in the cycle.

Other objects and advantages of the invention, including the proper co-ordination of the various features mentioned above, will become more apparent from the detailed description which will follow. While the invention is disclosed herein as applied to a specific type of machine, and while it is admirably suited for this specific purpose, it will be understood that it is capable of much broader application. In the drawings, which illustrate one suitable form of the invention, Figure 1 is a partial view in sectional elevation of a machine embodying the novel conveyer system.

Figure 3 is a sectional plan view taken on the line 3—3 of Figure 1.

Figure 4 is a sectional elevation on an enlarged scale of a table or support for the article or container carried by the conveyer system.

Figure 5 is a detailed view in section taken along the line 5—5 of Figure 4.

Figure 6 is a plan view of the supporting table and the ejecting mechanism.

Figure 7 is an enlarged sectional view taken along the line 7—7 of Figure 6.

Main machine

Figure 1:
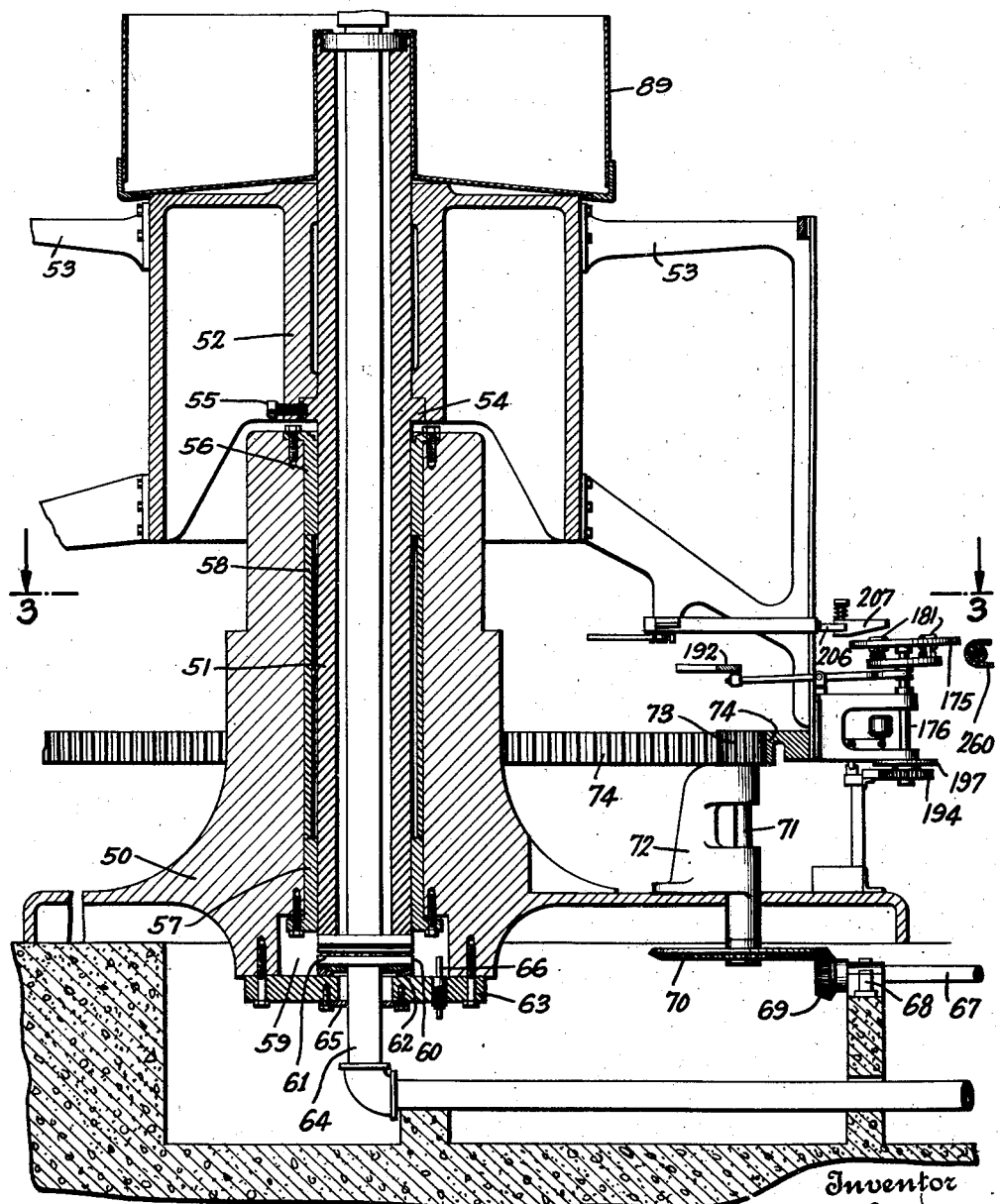

By reference to Figure 1 of the drawings it will be seen that in the particular embodiment of the invention thus illustrated the apparatus includes a hollow base or supporting element 50 through which extends a shaft 51 provided with a hub 52 carrying a plurality of radial arms 53. As illustrated, the shaft 51 may be formed with a flange or collar 54 by which the hub is secured thereto, as by means of set-screws 55. The shaft 51 works within an upper bushing 56, lower bushing 57 and an intervening sleeve 58. The pedestal 50 may conveniently be formed with a hollowed-out portion 59 to form a lubricant housing or reservoir for the main bearings of the shaft 51 located therein. The main bearing is shown as consisting of ball-bearings 60 and ball-races 61. An alignment plate 62, supported by the closure plate 63, serves to hold the bearings in proper position. A lubricant overflow pipe 66 may be provided.

Power for operating the apparatus may be supplied by a shaft 67 suitably mounted in bearings 68 and operated by any convenient means. The shaft 67 carries a bevel pinion 69 which meshes with a bevel gear 70 mounted on shaft 71 suitably supported in a bearing block 72. The shaft 71 carries a pinion 73 in mesh with a ring gear 74 which is secured to the several arms 53. It is apparent that when the shafts 67 and 71 are rotated, the main conveyer element of the apparatus is rotated upon the shaft 51 as an axis.

Support unit

In the aforementioned parent application suitable mechanism is described for weighing out definite quantities of the fluid material which it is desired to charge into suitable containers and for dispensing this fluid at the appropriate time into the containers. Mechanism is also described therein for the purpose of applying caps to the openings in the containers to seal the latter. As these mechanisms form no part of the subject matter intended to be covered by this application, they need not be disclosed herein. It will be understood, however, that the conveyer system which is described and shown is particularly applicable to an apparatus embodying those, or similar, mechanisms and one in which a container or other article may be shifted or adjusted on the main conveyer element so that it may be acted upon by a number of distinct tools or units in cyclic order.

For the purpose of adjustably supporting the containers A, there may be provided, as best shown in Figure 4, a table or support 175 mounted on a shaft 176. The shaft may be provided with a collar 177 and the shaft thus journalled on a thrust bearing 178 supported on a bracket member 179 that is secured to a pair of adjacent arms 53 or faces 53a thereof.

In order to hold the can or container A in proper position for the operations to be performed on it, appropriate gripping or retaining means is provided. In the apparatus illustrated, the table 175 is formed with a plurality of slots 180 (see Figs. 6 and 7) through which gripping means is arranged to protrude for the purpose of engaging the can. The type of mechanism shown is adapted to accommodate square cans or containers but the specific design may of course be varied to suit the particular type of article to be handled. As shown in Figure 7, jaws 181 are mounted on pins 182. Each jaw member is in effect in the form of a lever fulcrumed on a pin 182 with one end of the lever adapted to pass through a slot 180 and thus engage the container A. The other end of each jaw member 181 is connected, by means of a link 183 and a pin 184 mounted on lugs 185, to a clutch member 186 which preferably assumes the form of a disc or plate slidably mounted on the shaft 176. A clutch lever 187 is provided for actuating the clutch plate 186. The clutch lever is pivotally mounted on a pin 188 supported on a bracket 189. One end of the lever 187 is in the form of a yoke that is adapted to engage in a peripheral groove in the clutch member 186. Each member of the yoke may well be provided with a stud 190 carrying an anti-friction roller. The other end of the clutch lever is equipped with a roller 191 adapted to engage a cam 192. In the arrangement illustrated, the clutch lever 187 and clutch plate 186 are actuated by gravity to cause the jaws 181 to be raised above the surface of the table 175 and grip the container A. When the roller 191 engages with the cam 192, the cam end of the lever is depressed and the clutch end of the lever is raised, thus releasing the jaws 181 from engagement with the container A. The cam 192 is so arranged that the gripping means 181 is held below the surface of the table 175 to permit the completed article, or filled and capped container, to be discharged from the machine and a new one substituted in its place. (See Fig. 3).

The table 175 is mounted at an angle, as clearly indicated in the drawings, so as to position the container thereon in an inclined or tilted position. This, as more fully explained in the parent case, enables the insertion of the spout of the funnel or dispensing member in an opening on the elevated side of the container so that it may be more readily filled to capacity than if it were supported in a level position.

Means is provided for moving the table 175 so as to change the container A from the filling position to the capping position and vice versa. Thus, the shaft 176 carries a pinion 194 adapted to co-operate with racks 195 and 196. (For position of racks see Fig. 3). The rack 195 is adapted to rotate the table 175 from the filling to the capping position and rack 196 is adapted to rotate the table from the capping to the filling position. It is preferable to provide means for holding the table in position after it has been rotated into the position desired. Thus, for example, a lock plate 197, which as illustrated may be constructed integral with the pinion 194, is formed with two holes 198 positioned on a diameter line. A weighted pin or detent 199, carried on one end of a rocker arm 200 and guided in a hole 201 in the bracket 179, is adapted to engage alternately the openings 198 and when so engaged locks the shaft 176 and table 175 against rotation. The other end of the rocker arm 200 is pivotally secured by a pin 202 supported on the bracket 179 and the arm is fulcrumed on a lift-pin 203. The latter pin is adapted to engage cams 204 and 205 adjacent the racks 195 and 196, respectively (see Fig. 3). The cams are adapted to raise the pin 203 so as to raise the lock-pin 199 out of engagement with an opening 198 in lock-plate 197. The openings 198 and 201 may, if desired, be provided with bushings, as shown, and bevelled approaches to the holes 198 may be formed on the surface of plate 197 so as to insure that the pin 199 will drop into position whenever either of the openings 198 registers with the opening 201.

When lift-pin 203 comes in contact with cam 204, the lock-pin 199 is moved out of engagement with lock-plate 197 and the co-action of rack 195 and pinion 194 operates to rotate shaft 176 and table 175. The movement is terminated at the end of half a revolution as the lock-pin 199 slips into the other opening 198, which thus serves to prevent overthrow. When the pin 203 comes in contact with the other cam 205, the lock-pin 199 is again moved out of engagement with the lock-plate 197 and the action of rack 196 and pinion 194 causes another half revolution of the table 175.

Discharge mechanism

The apparatus shown in the drawings for ejecting or discharging the cam or container from the machine, after it has been filled and capped, includes a push-rod 206 provided with a hand 207. The hand should be of a configuration suitable for the type and size of containers to be used; in the drawings the hand is shown as being in the form of a right angle prong suitable for square containers. Although the push-rod 206 and hand 207 may be integral with one another, it is advantageous to provide separate parts and to connect them by means of a flexible joint, so that in case of a jam occurring in the discharge of the containers, no injury to any of the containers will result. Thus, the push-rod 206 and hand 207 may be pivotally connected by means of a bolt 208 and torsion spring 209, which tends to hold the parts in the position shown but will yield to permit a pivotal movement of the hand on the push rod when any undue resistance is encountered.

Figure 2:
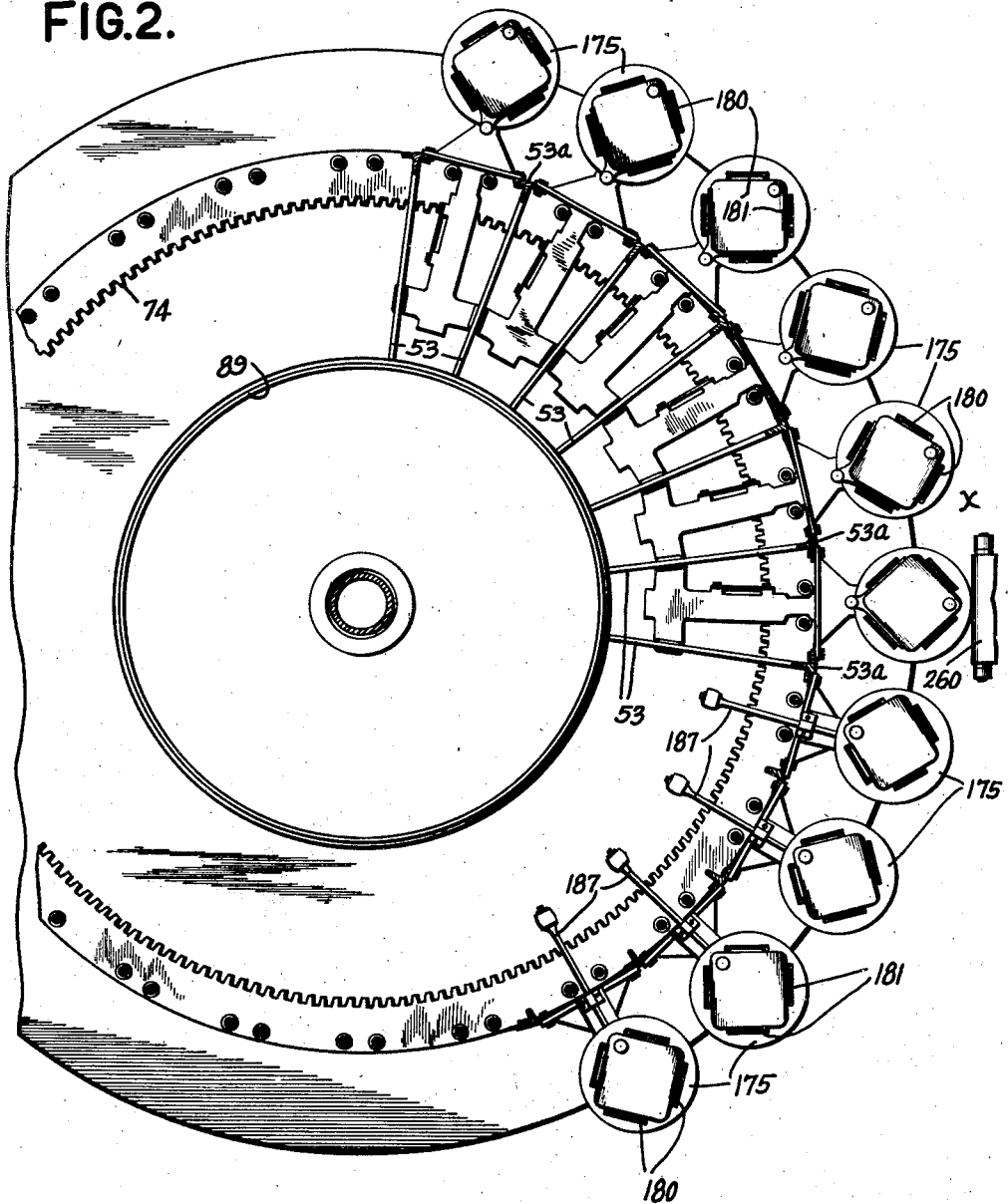
Figure 2 is a plan view partly cut away, with certain parts omitted, and partly in sections taken along planes at different elevations.

The push-rod 206 is guided and supported in a bracket 210 attached to a pair of adjacent arms 53. The push-rod is provided with a stud 211 carrying a roller 212 adapted to travel in a camway 213. The position and formation of the cam 213 is shown in Figure 3. The cam is arranged to so actuate the push-rod 206 that it will, after the container has been filled and capped, operate to bring the hand in contact with the container and discharge same from the table 175. It will be observed that the inclination of the camway with respect to the circular path of travel of the filling and capping units is at first at a slight angle and that the angle increases sharply as the apex of the camway at the point of discharge is reached, or, in other words, the angle of the camway with radii lines of the rotary apparatus approximates a right angle in the first portion of the camway and progressively decreases as the point of discharge is reached. It is likewise preferable to form that portion of the camway, which serves to cause the withdrawal of the ejecting mechanism, with a relatively sharp angle with respect to the path of travel of the filling and capping units. This configuration of the cam insures that the ejecting member shall not be pushed against the container A with undue force so as to injure same and yet that when the ejector has come into contact with the container, it will move with increased speed and thus quickly discharge the container from the table, after which the ejecting mechanism is rapidly withdrawn so as to permit another container to be admitted to the table, with a minimum period of time intervening between the discharge of the finished container and the admission of the new container. The container thus removed from the machine may conveniently be discharged to a travelling belt or conveyer 260, as indicated in Figures 1 and 2.

The cam 213 is preferably arranged so as to withdraw the push-rod 206, after the discharge of a container, a predetermined distance in order to hold the hand 207 over the table in such a manner that another container A may be properly centered within the openings 180 on the table. It will be noted that the camway 213 comprises a portion that extends approximately concentric with the circular path of travel of the table. The roller 212 travelling in this portion of the camway holds the hand 207 in position so that the container can be placed on the table in proper position. After the container has thus been properly positioned, the gripping members 181 engage the container and the hand 207 is completely withdrawn from the table.

Operation

A brief summary of the operation of the various features of the conveyer system in their co-ordinated relation may aid in the understanding of the invention.

The main conveyer element, including the sleeve 51, hub 52, radial arms 53 and elements supported thereby, is continuously rotated about the stationary support or pedestal 50 by means of the action of the pinion 73 on the internal ring gear 74 carried by the arms 53. The pinion 73 is secured to the shaft 71, which is driven by means of the bevelled gears 69 and 70 from the main operating shaft 67, which in turn is driven by any suitable means at a desired rate of speed. A desired number of inclined tables 175 are rotatably mounted on the conveyer element as by being mounted on the upper ends of shafts or spindles 176. These supporting tables are carried bodily with the main conveyer element through successive cycles of the machine.

The operation may be considered as starting at the point X in Figure 2, where new articles or containers may be placed upon the successive empty supporting tables, either manually by an operator stationed at this point or by some automatic means. The hand 207 associated with a table passing the point X is so positioned that it serves as a stop or guide for the correct centering of the container on the table. At this time the gripping devices will be held in inactive position by the co-operation of the cam element 192 with the roller 191 on the lever 187. Now, as the table advances and the roller 191 clears the cam 192, the gripping devices 181 will be rocked into active position by means of the weight of the clutch plate 186. At about the same time that the gripping devices are rendered effective, or shortly thereafter, the hand 207 will be withdrawn from engagement with the container due to the action of the cam 213 on the roller 212.

The container will be carried with the table in the same relation through something more than half of the cycle of the main conveyer element, during which time certain operations may be performed, as for example the introduction of the fluid material into the container. After this operation has been completed, the pin 203 attached to the arm 200, which carries the weighted detent 199, will co-operate with the cam lug 204 to raise the detent and permit the rotation of the table. Immediately following the lifting of the detent, the pinion 194 secured to the shaft 176 will be brought into co-operation with the fixed rack segment 195, which will serve to rotate the pinion and table through 180°. In the meantime, the detent 199 will have been released so that it may drop into the other of the two holes 198, thus arresting rotary movement of the table after its half revolution and retaining it in its new position.

During the following period a different operation may be performed on the container, as for example the application of a cap or seal. When this operation is completed, and as the table approaches, the endless conveyer 260 (Figs. 1 and 2), the roller 212 of the ejector mechanism will enter the camway 213 so that the hand 207 will first be moved slowly until it engages the container and then will be moved more quickly to eject the container and pass it onto the conveyer 260. During this same portion of the cycle, the roller 191 will have been brought into co-operation with the camming element 192 to release the gripping devices 181 and hold them inactive during the ejecting operation and until a new container has been introduced, as explained at the outset. The hand 207 will thereafter be quickly withdrawn to the point where it serves as a guide or positioning means for the new container. In the meantime, the pin 203 will be brought into co-operation with the cam 205 to raise the detent 199, and the pinion 194 will co-operate with the rack segment 196 to again rotate the supporting table through 180° to its original position. The supporting table is now brought to the starting position indicated at X and is ready to follow through the same cycle. It will be understood that each of the plurality of tables carried by the main conveyer element will follow through the same cycle and that as a group they enter successively upon the different stages of the cycle.

While a specific form of the invention has been illustrated in the drawings and described in the foregoing, it will be understood that many changes may be made in the specific mechanisms employed and the nature of their co-operation without departing from the spirit of the invention. It is not desired to be limited in the interpretation of the scope of the invention other than by the terms of the claims which follow.

What I claim is:

1. A continuously moving conveyer comprising a rotary element, individual supports rotatably mounted on said element and each adapted to hold an article to be conveyed in an inclined position, means for rotating said supports at pre-determined points in the cycle of movement of said rotary element, and means for ejecting articles from said supports at a pre-determined point in said cycle.

2. A conveyer system comprising a continuously movable member, a plurality of supports rotatably mounted on said member and adapted to hold articles in a plurality of different inclined positions on said member, the axis of rotation of said support passing through the article carried thereby, and means for rotating said supports during the movement of said member.

3. A conveyer system comprising a continuously movable member, a plurality of supports rotatably mounted on said member and adapted to hold articles in a plurality of different inclined positions on said member, the axis of rotation of said support passing through the article carried thereby, means for rotating said supports during the movement of said member, and means for discharging articles from said supports as they reach a predetermined point.

4. A conveyer system comprising a continuously movable member, a plurality of supports rotatably mounted on said member and adapted to hold articles in a plurality of different positions on said member, the axis of rotation of said support passing through the article carried thereby, means for rotating said supports during the movement of said member, and means for discharging articles from said supports as they reach a predetermined point, said discharging means serving also as a positioning means when the articles are placed on said supports.

5. In apparatus of the class described a continuously moving endless conveyer, an inclined table rotatably mounted on said conveyer and adapted to support an article in a plurality of different positions, a detent for holding said table in its different positions, means for moving said conveyer through a cycle of operation, and means co-operating with said table during the movement of the conveyer through said cycle for releasing said detent and adjusting said table from one position to another and back to its original position to change the direction of inclination thereof.

6. In apparatus of the class described a continuously moving conveyer, a rotatable inclined table on said conveyer adapted to support a container, devices on said table for gripping a container, means for moving said container into different predetermined positions, means for ejecting the container at a predetermined position of the conveyer, and means for releasing said gripping devices prior to the operation of said ejecting means.

7. In apparatus of the class described a continuously moving conveyer, a rotatable table on said conveyer adapted to support a container in an inclined position, devices on said table for gripping the container, means for rotating the table to different predetermined positions, means for releasing the gripping devices, and means for ejecting the container from the table.

8. In apparatus of the class described a movable conveyer, a rotatable table on said conveyer adapted to support a container, devices on said table for gripping the container, means for rotating the table to different positions, means for releasing the gripping devices, a hand adapted to engage the container, and means for operating the hand to eject the container, said means acting to partially withdraw said hand to a point where it serves as a positioning member for a new container and subsequently acting to fully withdraw said hand, said releasing means being operated to permit the gripping devices to grip the new container.

9. In apparatus of the class described a movable conveyer, a rotatable table thereon adapted to support a container, means for rotating the table to different predetermined positions, a hand adapted to engage the container, means for operating the hand to eject the container and a yieldable connection between the hand and the operating means.

10. In apparatus of the class described a movable conveyer, a rotatable table thereon adapted to support a container, means for rotating the table to different positions, a hand adapted to engage the container, and means for operating the hand to eject the container, said means acting to partially withdraw said hand to a point where it serves as a positioning member for a new container and subsequently acting to fully withdraw said hand.

11. In apparatus of the class described a stationary frame, a continuously rotating conveyer carried thereby, a plurality of individual article supports rotatably mounted on said conveyer, means for rotating said supports to different predetermined positions, devices associated with said supports for gripping articles carried thereby, means for successively releasing said gripping devices upon the rotation of said conveyer, and means for successively ejecting the articles from their supports, said ejecting means serving also as a positioning means when the articles are placed on the supports.

12. In apparatus of the class described a rotary conveyer, a table having an inclined surface rotatably mounted on said conveyer, means for rotating said conveyer, and means for rotating said table at predetermined positions of said conveyer to change the direction of inclination of said table.

In witness whereof I have hereunto set my hand this 25th day of April, 1929.

ROLLIN L. DRAKE.